United States Patent
Belter et al.

(10) Patent No.: US 9,970,331 B1
(45) Date of Patent: May 15, 2018

(54) ARRANGEMENTS FOR OUTBOARD MARINE ENGINES HAVING REDUCED WIDTH

(71) Applicant: Brunswick Corporation, Lake Forest, IL (US)

(72) Inventors: David J. Belter, Oshkosh, WI (US); Gregg D. Langenfeld, Fond du Lac, WI (US); Mark A. Kollock, Oshkosh, WI (US)

(73) Assignee: Brunswick Corporation, Mettawa, IL (US)

( * ) Notice: Subject to any disclaimer, the term of this patent is extended or adjusted under 35 U.S.C. 154(b) by 91 days.

(21) Appl. No.: 15/198,748

(22) Filed: Jun. 30, 2016

(51) Int. Cl.
| | |
|---|---|
| F02B 61/04 | (2006.01) |
| B63H 20/00 | (2006.01) |
| F01L 1/053 | (2006.01) |
| B63H 20/24 | (2006.01) |
| F01L 1/02 | (2006.01) |
| F01L 9/02 | (2006.01) |
| F02B 75/22 | (2006.01) |

(52) U.S. Cl.
CPC .............. *F01L 1/053* (2013.01); *B63H 20/00* (2013.01); *B63H 20/24* (2013.01); *F01L 1/022* (2013.01); *F01L 9/02* (2013.01); *F02B 61/045* (2013.01); *F02B 75/22* (2013.01); *B63B 2770/00* (2013.01); *F01L 1/0532* (2013.01); *F01L 2001/0537* (2013.01)

(58) Field of Classification Search
CPC ... F01L 1/053; F01L 1/022; F01L 9/02; F01L 1/0532; F01L 2001/0537; F02B 75/22; F02B 61/045; B63H 20/24; B63H 20/00; B63B 2770/00

USPC .......... 123/90.6, 90.31, 195; 440/88 A, 88 L
See application file for complete search history.

(56) References Cited

U.S. PATENT DOCUMENTS

| | | | | |
|---|---|---|---|---|
| 5,797,817 | A * | 8/1998 | Senftleben | ................ F01L 1/02 474/110 |
| 6,425,360 | B1 * | 7/2002 | Kashima | ................... F01L 1/02 123/195 C |
| 7,650,862 | B2 * | 1/2010 | Matsuda | ................. F01L 1/022 123/90.27 |
| 9,228,455 | B1 | 1/2016 | Belter et al. | |

(Continued)

FOREIGN PATENT DOCUMENTS

JP 07042614 A * 2/1995

*Primary Examiner* — Anthony D Wiest
(74) *Attorney, Agent, or Firm* — Andrus Intellectual Property Law, LLP

(57) ABSTRACT

An outboard marine engine comprises a vertically aligned bank of piston-cylinders; an intake camshaft that operates a plurality of intake valves for controlling inflow of air to the bank of piston-cylinders; an exhaust camshaft that operates a plurality of exhaust valves for controlling outflow of exhaust as from the bank of piston-cylinders; and a cam-to-cam connector that connects the intake camshaft to the exhaust camshaft such that rotation of one of the intake and exhaust camshafts causes rotation of the other of the intake and exhaust camshafts. The cam-to-cam connector is located vertically above a lowermost intake valve in the plurality of intake valves, vertically above a lowermost exhaust valve in the plurality of exhaust valves, vertically below an uppermost intake valve in the plurality of intake valves and vertically below an uppermost exhaust valve in the plurality of exhaust valves.

5 Claims, 8 Drawing Sheets

(56) References Cited

U.S. PATENT DOCUMENTS

| | | | |
|---|---|---|---|
| 9,587,529 B2* | 3/2017 | Kawakami | F01L 1/46 |
| 2015/0090210 A1* | 4/2015 | Sugiura | F01L 1/047 |
| | | | 123/90.34 |

* cited by examiner

US 9,970,331 B1

ARRANGEMENTS FOR OUTBOARD MARINE ENGINES HAVING REDUCED WIDTH

FIELD

The present disclosure relates to marine engines, and particularly to outboard marine engines having dual overhead camshaft arrangements.

BACKGROUND

U.S. Pat. No. 9,228,455 is incorporated herein by reference in entirety and discloses a marine engine for an outboard motor comprising a bank of piston-cylinders, an intake camshaft that operates intake valves for controlling inflow of air to the bank of piston-cylinders, an exhaust camshaft that operates exhaust valves for controlling outflow of exhaust gas from the bank of piston-cylinders, and a cam phaser disposed on one of the intake camshaft and exhaust camshaft. The cam phaser is connected to and adjusts a timing of operation of the other of the intake camshaft and exhaust camshaft with respect to the one of the intake camshaft and exhaust camshaft.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, an outboard marine engine comprises a vertically aligned bank of piston-cylinders; an intake camshaft that operates a plurality of intake valves for controlling inflow of air to the bank of piston-cylinders; an exhaust camshaft that operates a plurality of exhaust valves for controlling outflow of exhaust gas from the bank of piston-cylinders; and a cam-to-cam connector that connects the intake camshaft to the exhaust camshaft such that rotation of one of the intake and exhaust camshafts causes rotation of the other of the intake and exhaust camshafts. The cam-to-cam connector is located vertically above a lowermost intake valve in the plurality of intake valves, vertically above a lowermost exhaust valve in the plurality of exhaust valves, vertically below an uppermost intake valve in the plurality of intake valves, and vertically below an uppermost exhaust valve in the plurality of exhaust valves. One of the intake and exhaust camshafts is an outboard camshaft, the other of the intake and exhaust camshaft is an inboard camshaft. The outboard camshaft is shorter than the inboard camshaft and the inboard camshaft extends vertically lower than the outboard camshaft. An engine head and a cam cover together enclose the intake and exhaust camshafts. The engine head and cam cover define an outer sidewall with an upper portion that extends vertically and a lower portion that is inwardly tapered from the upper portion.

BRIEF DESCRIPTION OF THE DRAWINGS

The present disclosure includes the following Figures. The same numbers are used throughout the Figures to reference like features and like components.

DETAILED DESCRIPTION OF THE DRAWINGS

FIGS. 1-4 are taken from the above-incorporated U.S. Pat. No. 9,228,455. The following description of FIGS. 1-4 is also taken from U.S. Pat. No. 9,228,455.

Figure 1:
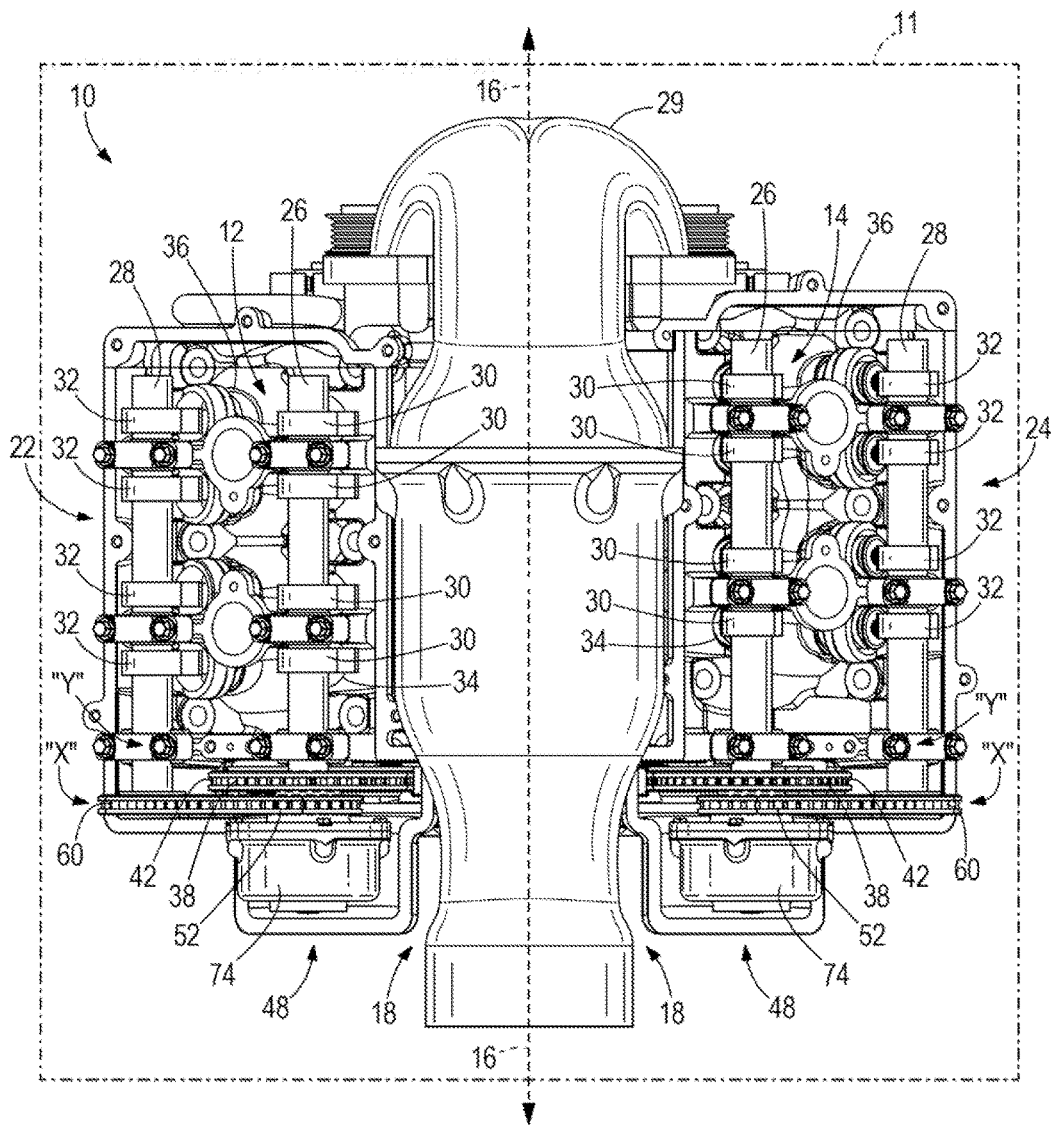
FIG. 1 is a rear view of a marine engine.
Figure 2:
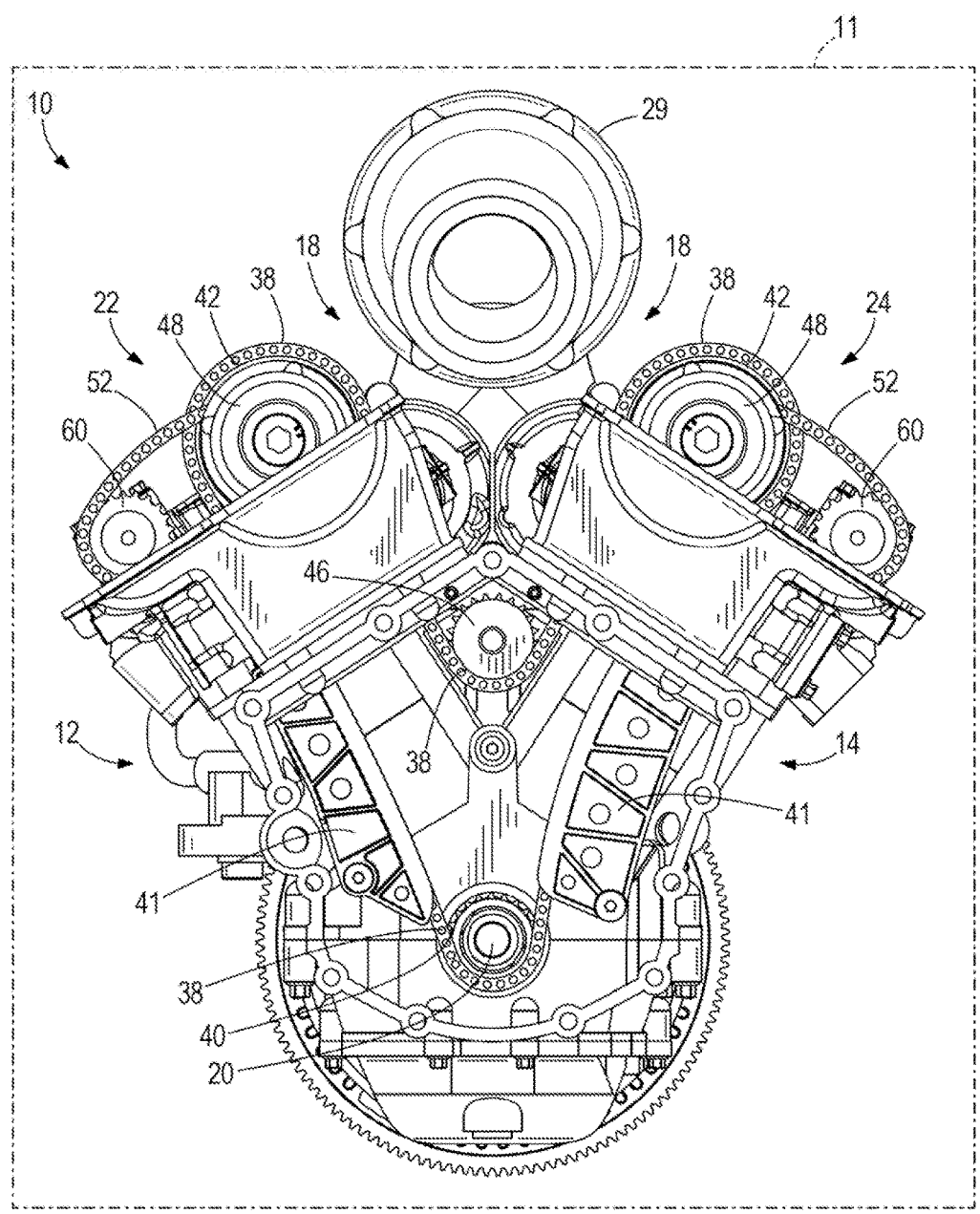
FIG. 2 is a bottom view of the marine engine shown in FIG. 1.

FIGS. 1-2 depict a marine internal combustion engine 10 for an outboard motor 11. The engine 10 has first and second banks of piston-cylinders 12, 14 that are disposed along a vertical, longitudinal axis 16. The first and second banks of piston-cylinders 12, 14 extend transversely from each other and transversely from the longitudinal axis 16 in a V-shape (see FIG. 2) so as to define a valley 18 there between. As is conventional, combustion of air and fuel in the first and second banks of piston-cylinders 12, 14 causes reciprocation of pistons (not shown) in the banks of piston-cylinders 12, 14, which via connecting rods (not shown), causes rotation of a crankshaft 20 about the longitudinal axis 16.

FIGS. 1-4 depict dual overhead cam arrangements 22, 24 that are disposed on each of the first and second banks of piston-cylinders 12, 14. The dual overhead cam arrangements 22, 24 are configured such that rotation of the crankshaft 20 (see FIG. 3, arrows A) about the longitudinal axis 16 allows flow of intake air to the first and second banks of piston-cylinders 12, 14 and allows flow of exhaust gas from the first and second banks of piston-cylinders 12, 14. More specifically, each dual overhead cam arrangement 22, 24 includes an exhaust camshaft 26 and an intake camshaft 28. The exhaust camshaft 26 and intake camshaft 28 extend parallel to each other and extend parallel to the longitudinal axis 16 shown in FIG. 1. As shown in FIGS. 1 and 2, the exhaust camshaft 26 is located closer to the valley 18 than the intake camshaft 28. Each of the intake and exhaust camshafts 26, 28 carries cam lobes 30, 32 that operate exhaust and intake valves 34, 36, respectively, on the first and second banks of piston-cylinders 12, 14. The exhaust valves 34 are located closer to the valley 18 than the intake valves 36. As explained further herein below, rotation of the crankshaft 20 (arrows A) causes rotation of the intake and exhaust camshafts 26, 28 (see FIG. 3, arrows B, C), which causes rotation of the cam lobes 30, 32, which in turn cams open the exhaust and intake valves 34, 36, respectively. Continued rotation of the intake and exhaust camshafts 26, 28, further rotates the cam lobes 30, 32, which allows springs on the exhaust and intake valves 34, 36 to close the exhaust and intake valves 34, 36, respectively. This opening/ closing cycle repeats during the combustion process to allow intake air into the piston-cylinders 12, 14 for combustion and to emit exhaust gas from the piston-cylinders 12, 14 for discharge after combustion. An exhaust conduit 29 carries exhaust gas from the piston-cylinders 12, 14.

Figures 3, 4:
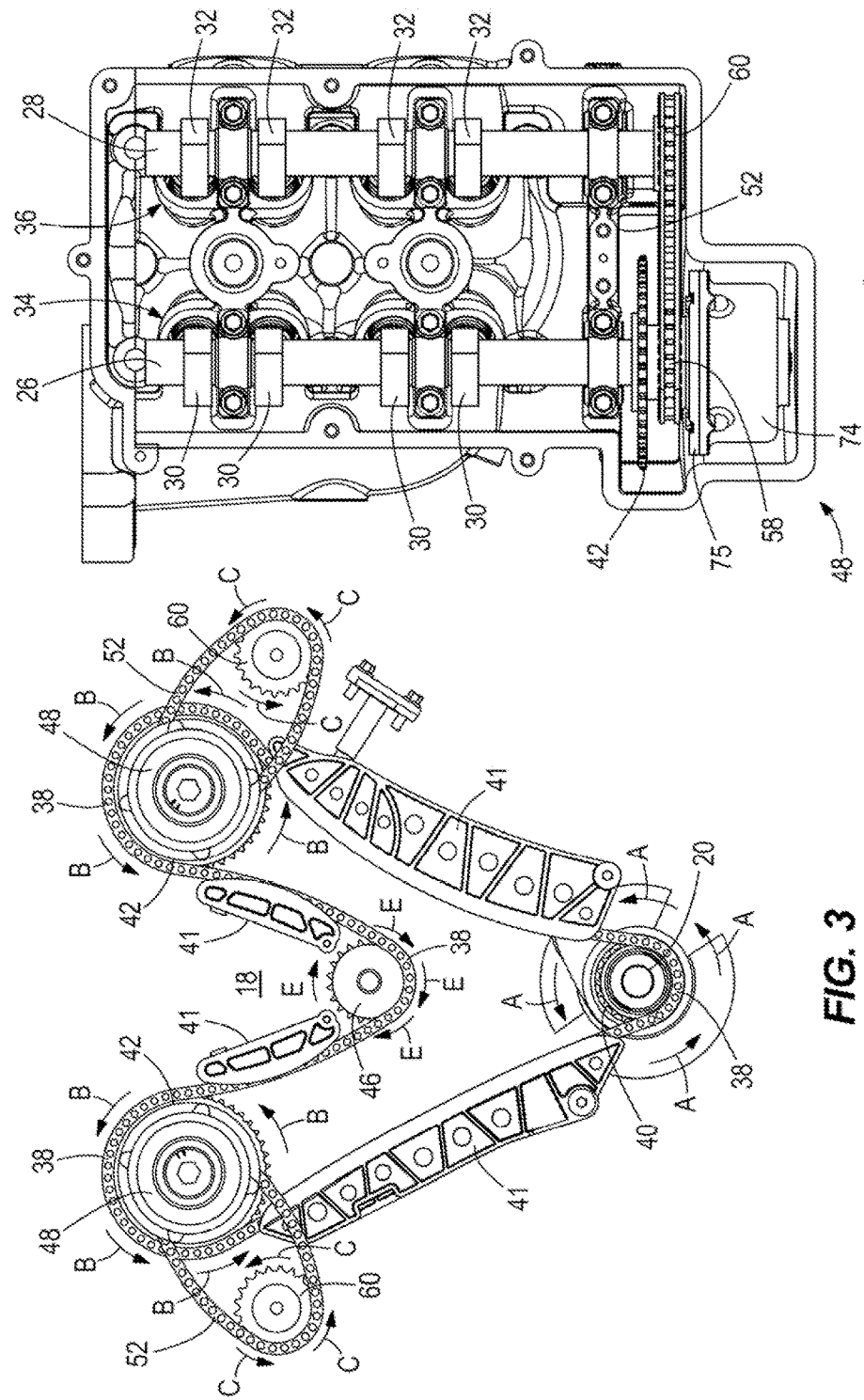
FIG. 3 is a view of a crankshaft and pair of dual overhead cam arrangements for the marine engine shown in FIG. 1.
FIG. 4 is a view of one of the dual overhead cam arrangements.

Referring to FIG. 3, combustion in the first and second banks of piston-cylinders 12, 14 causes rotation of the crankshaft 20 (arrows A), which in turn causes rotation of the exhaust camshafts 26 (arrows B). The crankshaft 20 is operatively connected to the exhaust camshafts 26 via a flexible connector, which in this example is a chain 38. The type of connector can vary and in certain examples can include a belt, gear, and/or the like. The chain 38 is driven into movement by a drive sprocket 40, which is disposed on the crankshaft 20 and engaged with the chain 38. Movement of the chain 38 engages with sprockets 42 on the exhaust camshafts 26, thereby causing rotation of the exhaust camshafts 26 (arrows B) about their own axes. An idler sprocket 46 is located at a center of the valley 18. The idler sprocket 46 is engaged with and driven into rotation about its own axis (arrows E) by movement of the chain 38. The idler sprocket 46 supports movement of the chain 38. Movement of the chain is also supported by conventional chain guides 41.

Additional cam-phaser related features represented by reference characters 48, 52, 58, 60, 74, and 75 in FIGS. 1-4 operate in accordance with the principles described in the above-mentioned U.S. Patent to cause phased rotational movement, for example shown by arrows C in FIG. 3. These and other features are more fully explained in the incorporated U.S. Patent. These features are not central to the present disclosure and thus, for brevity, are not further herein described.

During research and experimentation with outboard motors, the present inventors have determined that it is desirable to maintain a minimum width (see FIG. 1) of the outboard motor. Reducing the width allows for numerous packaging and performance advantages including for example allowing mounting and full range of steering with respect to the marine vessel and surrounding components, including clearance from adjacent outboard motors in dual- or quad-outboard arrangements. In particular examples it can be desirable to achieve 26-inch center-to-center distances on large outboard motors, when mounting more than one outboard motor on the marine vessel.

Through research and experimentation, the present inventors have also determined that widest portion of the outboard motor typically is in the area of the cam-to-cam-drive. See the locations denoted with the letter X in FIG. 1. In addition, outboard motors are typically encased in a cowling (not shown). The cowling typically includes upper and lower cowl portions that are sealed together at a cowl seal. The upper cowl portion is normally removable from the lower cowl portion (or pivotable away from the lower cowl portion) to permit maintenance of the outboard motor. Preferably the cowling is configured so that removal of the upper cowl portion provides access to spark plugs on the engine. Thus, it is preferable for the seal between the upper and lower cowl portions to be located below spark plugs on the engine. Since the noted cowl seal typically protrudes inwardly towards the engine at the location "X" shown in FIG. 1, the present inventors have determined that extra space is needed in this area to reduce the width to a minimum.

Through research and experimentation the present inventors have also determined that it is surprisingly possible to reduce the width of the outboard motor by locating the cam-to-cam drive higher up on the intake and exhaust camshafts, above a lower-most intake valve and exhaust valve on the engine. By locating the cam-to-cam drive vertically higher up on the exhaust and intake camshafts, the length (height) of the engine can remain the same, however a lowermost cam bearing (see the letter Y in FIG. 1) on the outboard camshaft can be removed or omitted to thereby allow for formation of a recess or divot in the engine head, into which recess or divot the noted cowl seal can protrude. This effectively allows for the otherwise normally widest part of the outboard motor to be made thinner and thus advantageously allows for a narrower architecture. The recess or divot also advantageously reduces weight of the engine head, which leads to performance advantages. Location of the cam-to-cam drive vertically higher on the outboard motor prompted the present inventors to invent additional modifications to a chain tensioner for the cam-to-cam drive, as further described herein below.

Figure 8:
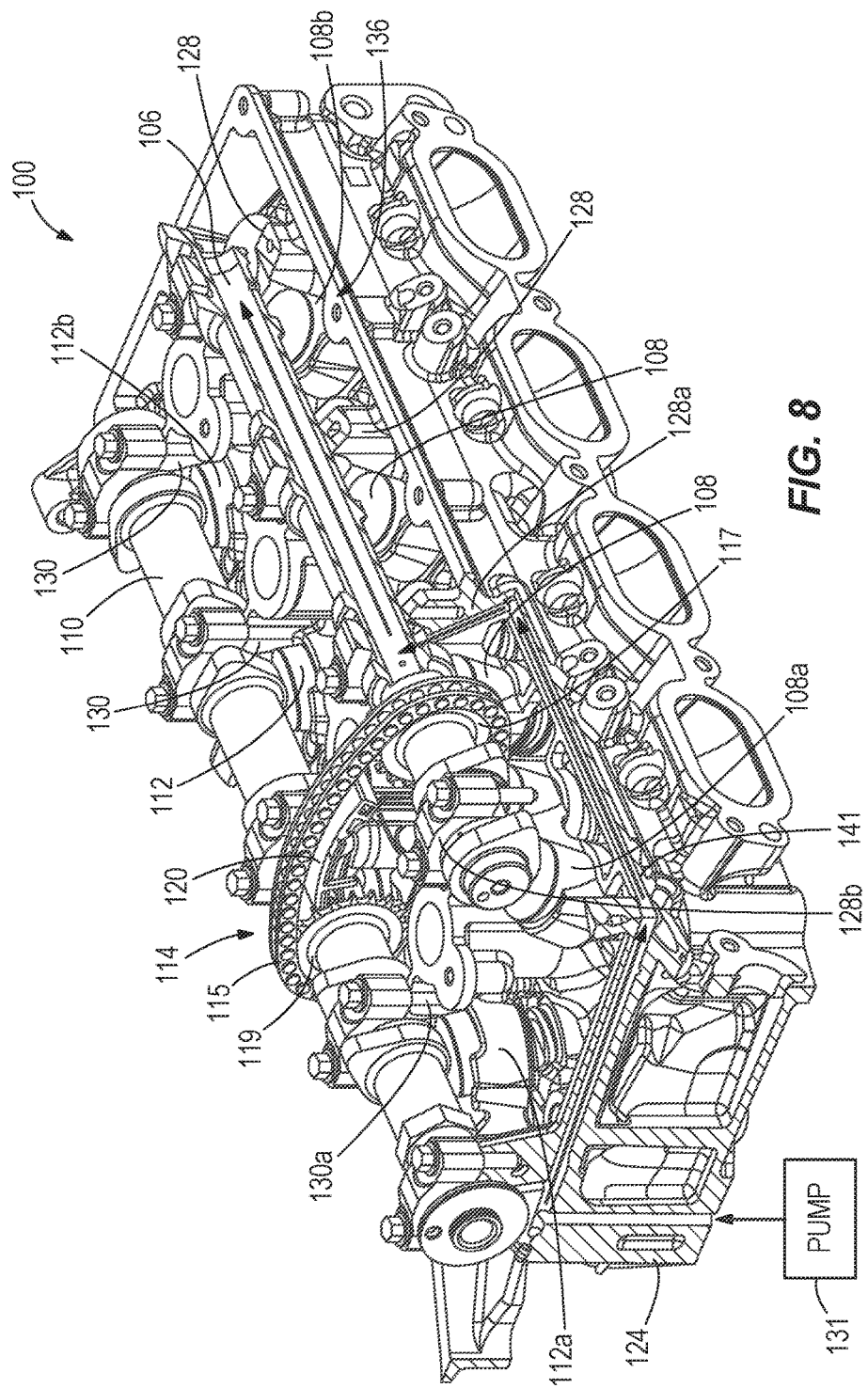
FIG. 8 depicts flow of hydraulic fluid to the chain tensioner.

FIGS. 5-8 depict one example of an outboard marine engine 100 according to the present disclosure. Similar to the example shown in FIGS. 1-4, the outboard marine engine 100 includes port and starboard vertically-aligned banks of piston-cylinders 102, 104. Referring to FIG. 8, each bank of piston-cylinders 102, 104 has an associated intake camshaft 106 that operates a plurality of intake valves 108 for controlling inflow of air to the respective bank of piston-cylinders 102, 104. Each bank of piston-cylinders 102, 104 has an exhaust camshaft 110 that operates a plurality of exhaust valves 112 for controlling outflow of exhaust gas from the respective bank of piston-cylinders 102, 104. Similar to the example described herein above, the exhaust camshaft 110 and associated exhaust valves 112 are located closer to the valley 105 (see FIG. 5) defined by the outboard marine engine 100 than the intake camshaft 106 and associated intake valves 108; however in other examples, the intake camshaft 106 and intake valves 108 can be located closer to the valley 105 than the exhaust camshaft 110 and exhaust valves 112.

Figure 5:
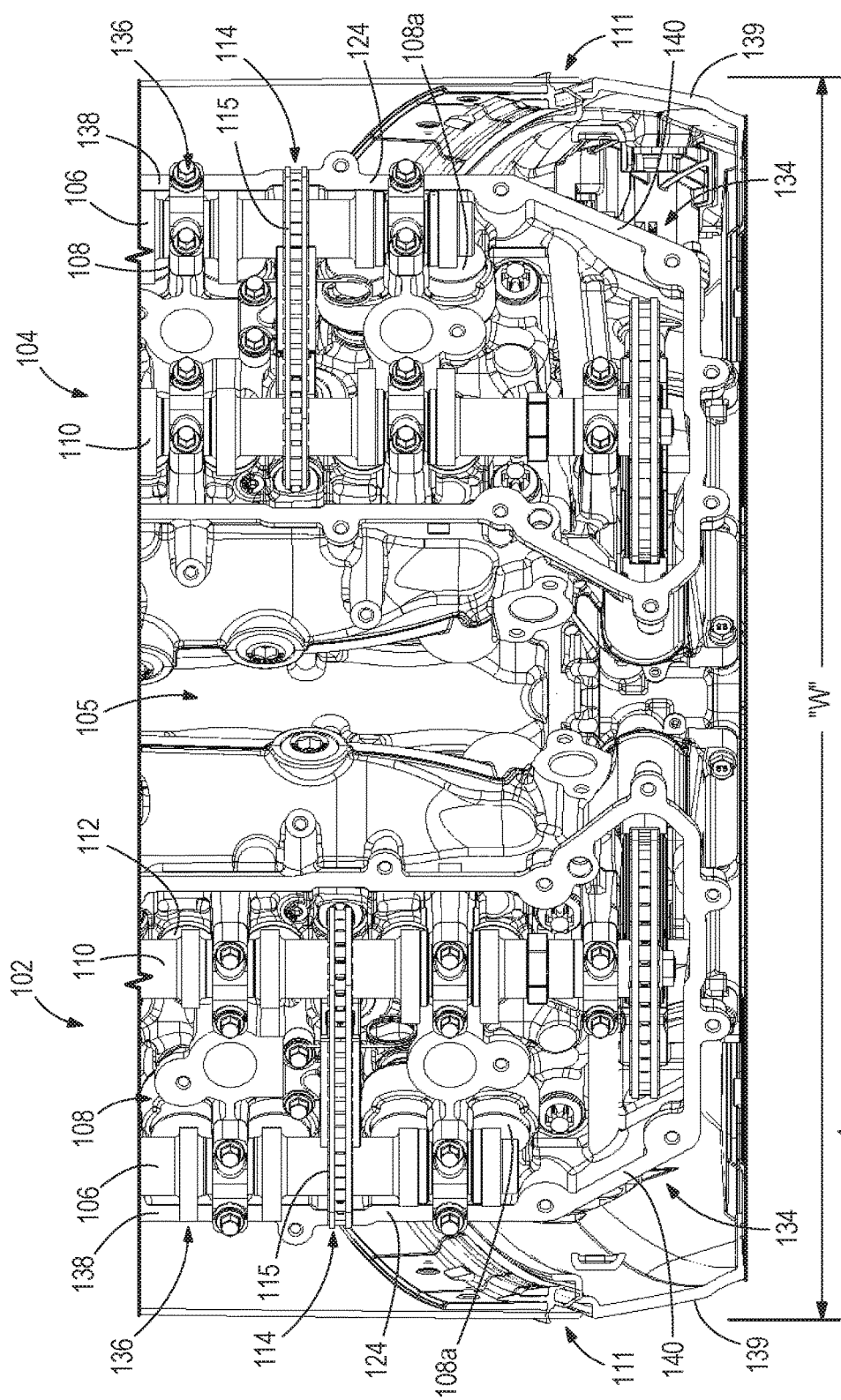
FIG. 5 is a partial rear view of a marine engine showing a cam-to-cam connector according to the present disclosure.
Figure 6:
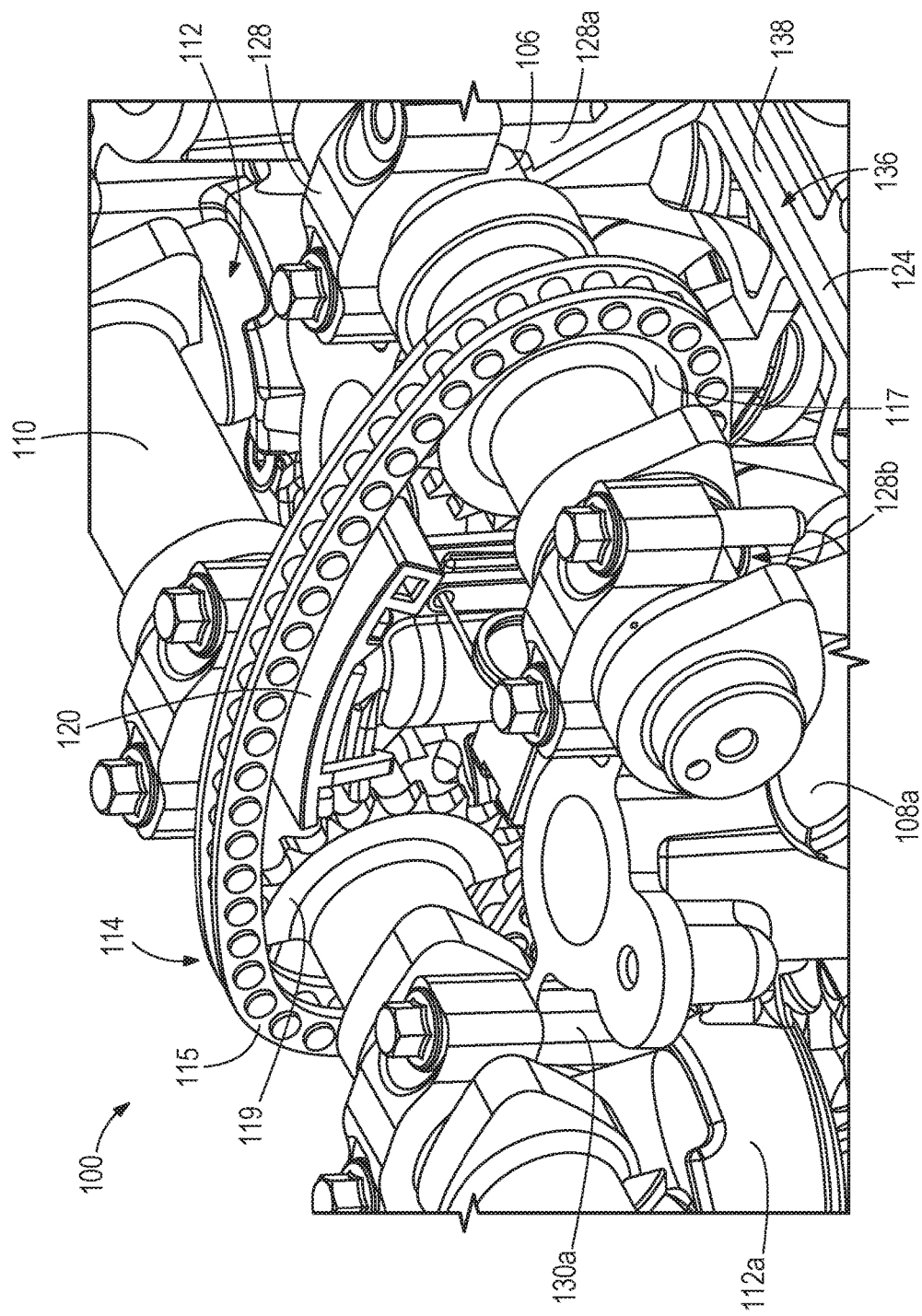
FIG. 6 is a perspective view of a chain tensioner on intake and exhaust camshafts of the marine engine.
Figure 7:
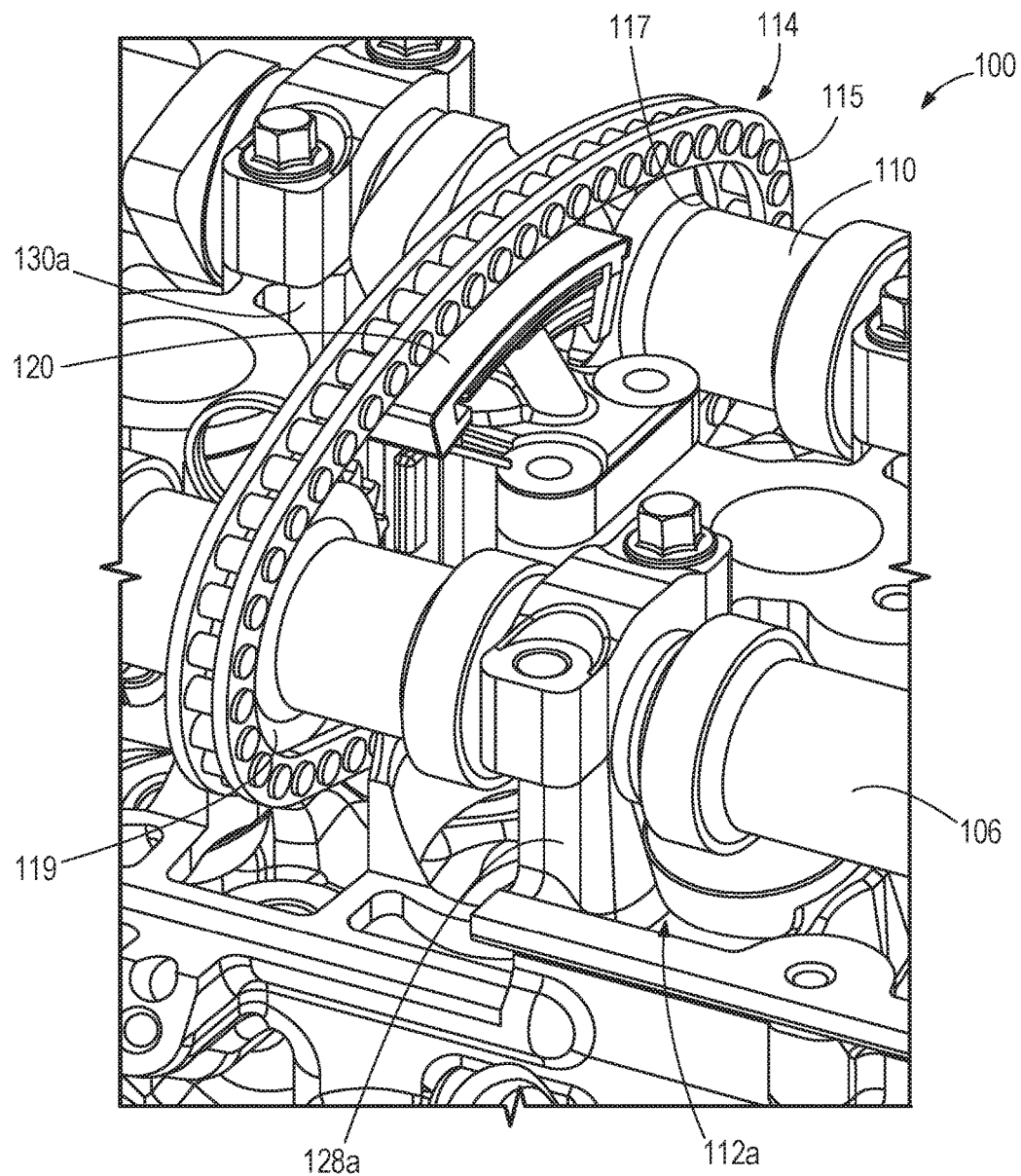
FIG. 7 is another perspective view of the chain tensioner on intake and exhaust camshafts of the marine engine.

Similar to the example shown in FIGS. 1-4, the outboard marine engine 100 includes a cam-to-cam connector 114 that connects the intake camshaft 106 to the exhaust camshaft 110 so that rotation of one of the intake and exhaust camshafts 106, 110 causes rotation of the other of the intake and exhaust camshafts 106, 110. However, unlike the example shown in FIGS. 1-4, the cam-to-cam connector 114 is located vertically higher than a lowermost intake valve 108*a* in the plurality of intake valves 108 and vertically higher than a lowermost exhaust valve 112*a* in the plurality of exhaust valves 112. Referring to FIG. 8, the cam-to-cam connector 114 is also located vertically below or lower than an uppermost intake valve 108*b* in the plurality of intake valves 108 and vertically below or lower than an uppermost exhaust valve 112*b* in the plurality of exhaust valves 112. Referring to FIG. 5, location of the cam-to-cam connector 114 vertically above or higher than the lowermost intake valve 108*a* and lowermost exhaust valve 112*a* facilitates formation of a relatively narrow width "w" at the location of the above-described cowl seal 111, which is narrower than the width shown in FIG. 1.

In the illustrated example, the cam-to-cam connector 114 includes a chain 115 that extends between a sprocket 117 on the intake camshaft 106 and a sprocket 119 on the exhaust camshaft 110. However, the type of cam-to-cam connector 114 could vary, and in other examples could include a belt and/or the like.

A chain tensioner 120 (see FIGS. 6 and 7) is disposed between the exhaust camshaft 110 and the intake camshaft 106. The chain tensioner 120 is located vertically above or higher than the lowermost intake valve 108*a* and the lowermost exhaust valve 112*a*. Referring to FIG. 8, the chain tensioner 120 is located vertically below or lower than the uppermost intake valve 108*b* in the plurality of intake valves 108 and vertically below or lower than the uppermost exhaust valve 112*b* in the plurality of exhaust valves 112. In the illustrated example, the chain tensioner 120 is a hydraulically-actuated chain tensioner; however the type and configuration of chain tensioner 120 could vary and in other examples could include an electrical and/or mechanical chain tensioner.

Figure 9:
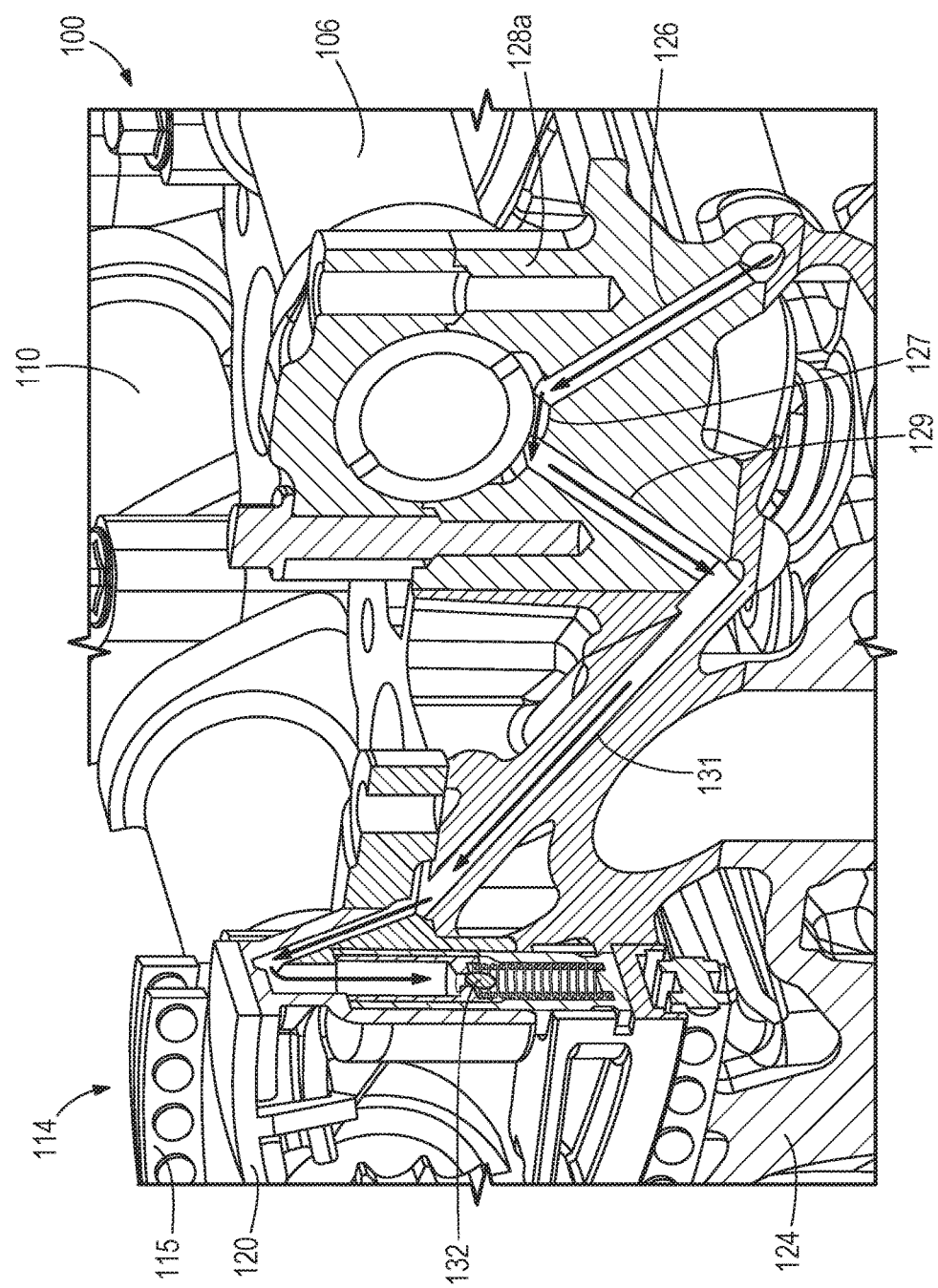
FIG. 9 depicts flow of hydraulic fluid to the chain tensioner.

Referring to FIGS. 8 and 9, the outboard marine engine 100 includes an engine, an engine head 124, a plurality of bearings 130 that support rotation of the exhaust camshaft 110 and a plurality of bearings 128 that support rotation of the intake camshaft 106. The chain tensioner 120 is mounted on the engine head 124. The chain tensioner 120 includes conventional pads that move apart from each other to apply tension to the chain 115 and move towards each other to relieve tension on the chain 115. The chain tensioner 120 expands and contracts depending upon pressure from a hydraulic pump 131. This type of hydraulic chain tensioner is known in the art and thus is not further described herein. The chain tensioner 120 receives hydraulic fluid via a series of hydraulic fluid passageways formed in the engine head 124 and in a bearing 128a located above a lowermost bearing 128b in the plurality of bearings 128. More specifically, a first hydraulic fluid passageway 126 is formed in the bearing 128a and conveys the hydraulic fluid from a passageway 141 formed in the engine head 124 to an oil gallery 127 located between the bearing 128a and the intake camshaft 106. A second hydraulic fluid passageway 129 is formed in the bearing 128a and conveys the hydraulic fluid from the oil gallery 127 to a third hydraulic fluid passageway 131, which conveys the hydraulic fluid to the chain tensioner 120. A conventional spring-loaded check valve 132 in the chain tensioner 120 controls flow of the hydraulic fluid to the chain tensioner 120 and thus controls the pressure applied by the chain tensioner 120 to the chain 115.

Referring to FIG. 5, the engine head 124 and associated cam cover (not shown) together have a tapered outboard lower side 134. More specifically, the engine head 124 and associated cam cover define an outer sidewall 136 having an upper portion 138 that extends vertically and a lower portion 140 that is inwardly tapered from the upper portion 138 to thereby form the tapered outboard lower side 134. Tapering of the engine head 124 and associated cam cover allows for a narrower width "w" defined by the outer cowling 139.

Referring to FIGS. 5 and 8, the intake camshaft 106 is an outboard camshaft and the exhaust camshaft 110 is an inboard camshaft. The intake camshaft 106 (i.e. inboard camshaft) extends vertically lower than the exhaust camshaft 110 (i.e. outboard camshaft). As shown in FIG. 8, the intake camshaft 106 is shorter than the exhaust camshaft 110. This configuration allows for the noted tapered outboard lower side 134 to thereby achieve the reduced width "w".

In the present description, certain terms have been used for brevity, clarity and understanding. No unnecessary limitations are to be inferred therefrom beyond the requirement of the prior art because such terms are used for descriptive purposes only and are intended to be broadly construed.

What is claimed is:

1. An outboard marine engine comprising:
a vertically aligned bank of piston-cylinders;
an intake camshaft that operates a plurality of intake valves for controlling inflow of air to the bank of piston-cylinders;
an exhaust camshaft that operates a plurality of exhaust valves for controlling outflow of exhaust as from the bank of piston-cylinders;
a cam-to-cam connector that connects the intake camshaft to the exhaust camshaft such that rotation of one of the intake and exhaust camshafts causes rotation of the other of the intake and exhaust camshafts;
wherein the cam-to-cam connector is located vertically above a lowermost intake valve in the plurality of intake valves, vertically above a lowermost exhaust valve in the plurality of exhaust valves, vertically below an uppermost intake valve in the plurality of intake valves and vertically below an uppermost exhaust valve in the plurality of exhaust valves;
wherein the cam-to-cam connector comprises a chain that extends around a sprocket on the intake camshaft and a sprocket on the exhaust camshaft;
a chain tensioner disposed between the exhaust camshaft and the intake camshaft, wherein the chain tensioner is located vertically above the lowermost intake valve and lowermost exhaust valve and vertically below the uppermost intake valve and uppermost exhaust valve;
wherein the chain tensioner is a hydraulically-actuated chain tensioner; and
wherein the internal combustion engine comprises an engine head and wherein the chain tensioner is mounted on the engine head;
a hydraulic fluid passageway formed in the engine head for conveying hydraulic fluid to the chain tensioner; and
a first plurality of bearings that support the intake camshaft and a second plurality of bearings that support the exhaust camshaft, and further comprising a hydraulic fluid passageway formed in one of the first and second pluralities of bearings and configured to convey the hydraulic fluid to the hydraulic fluid passageway formed in the engine head.

2. The outboard marine engine according to claim 1, comprising an engine head and a cam cover on the engine head, wherein the engine head and cam cover together comprise a tapered outboard lower side.

3. An outboard marine engine comprising:
a vertically aligned bank of piston-cylinders;
an intake camshaft that operates a plurality of intake valves for controlling inflow of air to the bank of piston-cylinders;
an exhaust camshaft that operates a plurality of exhaust valves for controlling outflow of exhaust gas from the bank of piston-cylinders;
a cam-to-cam connector that connects the intake camshaft to the exhaust camshaft such that rotation of one of the intake and exhaust camshafts causes rotation of the other of the intake and exhaust camshafts;
wherein the cam-to-cam connector is located vertically above a lowermost intake valve in the plurality of intake valves, vertically above a lowermost exhaust valve in the plurality of exhaust valves, vertically below an uppermost intake valve in the plurality of intake valves and vertically below an uppermost exhaust valve in the plurality of exhaust valves;
an engine head and a cam cover that encloses the intake and exhaust camshafts in the engine head, wherein the engine head and cam cover together define an outer sidewall with an upper portion that extends vertically and a lower portion that is inwardly tapered from the upper portion;
wherein one of the intake camshaft and exhaust camshaft is an outboard camshaft and wherein the other of the intake camshaft and exhaust camshaft is an inboard camshaft and wherein the outboard camshaft is shorter than the inboard camshaft at the lower portion; and wherein the inboard camshaft extends vertically lower than the outboard camshaft in the engine head; and upper and lower cowl portions encasing the vertically aligned banks of cylinders, the upper and lower cowl portions being mated together at a cowl seal that protrudes inwardly towards the engine head and cam cover along the lower portion.

4. The outboard marine engine according to claim 3, further comprising a crankshaft that is operably connected to the one of the intake camshaft and exhaust camshaft, wherein combustion in the bank of piston-cylinders causes rotation of the crankshaft, which in turn causes rotation of the one of the intake camshaft and exhaust camshaft.

5. An outboard marine engine comprising:
a pair of vertically aligned banks of piston-cylinders that are spaced apart and form a V-shape, each vertically aligned bank of piston-cylinders having
an intake camshaft that operates a plurality of intake valves for controlling inflow of air to the bank of piston-cylinders,
an exhaust camshaft that operates a plurality of exhaust valves for controlling outflow of exhaust as from the bank of piston-cylinders, and
a cam-to-cam connector that connects the intake camshaft to the exhaust camshaft such that rotation of one of the intake and exhaust camshafts causes rotation of the other of the intake and exhaust camshafts,
wherein the cam-to-cam connector is located vertically above a lowermost intake valve in the plurality of intake valves and vertically above a lowermost exhaust valve in the plurality of exhaust valves, vertically below an uppermost intake valve in the plurality of intake valves and vertically below an uppermost exhaust valve in the plurality of exhaust valves;
wherein each pair of vertically aligned bank of piston-cylinders is formed in an engine block, and further comprising an engine head on the engine block and a cam cover that encloses the intake camshaft and the exhaust camshaft;
wherein the engine head and cam cover together define an outer sidewall with an upper portion that extends vertically and a lower portion that is inwardly tapered from the upper portion;
wherein one of the intake and exhaust camshaft is an outboard camshaft and wherein the other of the intake and exhaust camshaft is an inboard camshaft and wherein the outboard camshaft is shorter than the inboard camshaft in the engine head;
wherein the inboard camshaft extends vertically lower than the outboard camshaft; and
upper and lower cowl portions encasing the vertically aligned banks of cylinders, the upper and lower cowl portions being mated together at a cowl seal that protrudes inwardly towards the engine head and cam cover along the lower portion.

* * * * *